US012063658B2

(12) United States Patent
Wang et al.

(10) Patent No.: US 12,063,658 B2
(45) Date of Patent: Aug. 13, 2024

(54) ENHANCEMENT OF LOGICAL CHANNEL PRIORITIZATION IN NR-U

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 541 days.

(21) Appl. No.: 17/279,251

(22) PCT Filed: Sep. 20, 2019

(86) PCT No.: PCT/EP2019/075306
§ 371 (c)(1),
(2) Date: Mar. 24, 2021

(87) PCT Pub. No.: WO2020/064538
PCT Pub. Date: Apr. 2, 2020

(65) Prior Publication Data
US 2022/0015130 A1 Jan. 13, 2022

(30) Foreign Application Priority Data
Sep. 26, 2018 (WO) ................ PCT/CN2018/107717

(51) Int. Cl.
*H04W 72/23* (2023.01)
*H04W 72/02* (2009.01)
(Continued)

(52) U.S. Cl.
CPC ........... *H04W 72/23* (2023.01); *H04W 72/02* (2013.01); *H04W 72/04* (2013.01);
(Continued)

(58) Field of Classification Search
CPC . H04W 72/23; H04W 72/02; H04W 72/1263; H04W 72/56; H04W 80/02; H04W 72/04; H04W 28/06
See application file for complete search history.

(56) References Cited

U.S. PATENT DOCUMENTS

2018/0048498 A1    2/2018  Stern-Berkowitz et al.
2018/0368107 A1*  12/2018  Babaei ................. H04W 76/00
(Continued)

FOREIGN PATENT DOCUMENTS

WO        2018129699 A1     7/2018

OTHER PUBLICATIONS

International Search Report and the Written Opinion of the International Searching Authority, issued in corresponding International Application No. PCT/EP2019/075306, dated Jan. 8, 2020, 18 pages.
(Continued)

*Primary Examiner* — Raj Jain
(74) *Attorney, Agent, or Firm* — Weisberg I.P. Law, P.A.

(57) ABSTRACT

The invention refers to a method for selecting logical channels for transmission on granted uplink (UL) resources within a cell of a radio access network (RAN) including receiving, from a network node in the RAN, a grant of resources associated with a carrier frequency in unlicensed spectrum, the carrier frequency comprising a plurality of radio channels, and selecting one or more of a plurality of logical channels for transmission during a subsequent transmission time interval, TTI, using the granted resources, wherein the selecting is based on respective priorities associated with the logical channels and information indicating the respective availabilities, and/or radio qualities of the radio channels. The invention further relates to methods for configuring selection of logical channels for transmission on granted UL resources within a cell of a RAN, as well as a
(Continued)

network node and user equipment configured to perform operations corresponding to the referred methods.

14 Claims, 11 Drawing Sheets

(51) Int. Cl.
    *H04W 72/04*         (2023.01)
    *H04W 72/0453*    (2023.01)
    *H04W 72/1263*    (2023.01)
    *H04W 72/56*       (2023.01)
    *H04W 80/02*       (2009.01)

(52) U.S. Cl.
    CPC ... *H04W 72/0453* (2013.01); *H04W 72/1263* (2013.01); *H04W 72/56* (2023.01); *H04W 80/02* (2013.01)

(56) References Cited

U.S. PATENT DOCUMENTS

| | | | | |
|---|---|---|---|---|
| 2019/0089438 | A1* | 3/2019 | Hosseini | H04W 76/27 |
| 2019/0313409 | A1* | 10/2019 | Tian | H04W 72/21 |
| 2020/0053779 | A1* | 2/2020 | Jeon | H04B 17/318 |
| 2020/0305144 | A1* | 9/2020 | Babaei | H04L 5/0064 |
| 2022/0015130 | A1* | 1/2022 | Wang | H04W 72/1263 |

OTHER PUBLICATIONS

MediaTek Inc. "Configured grant enhancements for NR-U" 3GPP TSG-RAN WG2 Meeting #103, R2-1812340, Gothenburg, Sweden, Aug. 20-24, 2018, 3 pages.

* cited by examiner

| | LCH/CE 0 | LCH/CE 1 | LCH/CE 2 | LCH/CE 3 | LCH/CE 4 | LCH/CE 5 | LCH/CE 6 | LCH/CE 7 |
|---|---|---|---|---|---|---|---|---|
| Ch.5 | 0 | 0 | 0 | 0 | 0 | 0 | 1 | 1 |
| Ch.4 | 0 | 0 | 0 | 0 | 1 | 1 | 1 | 1 |
| Ch.3 | 0 | 1 | 1 | 1 | 1 | 1 | 0 | 0 |
| Ch.2 | 1 | 1 | 1 | 1 | 0 | 0 | 0 | 0 |
| Ch.1 | 1 | 1 | 0 | 0 | 0 | 0 | 0 | 0 |

ENHANCEMENT OF LOGICAL CHANNEL PRIORITIZATION IN NR-U

CROSS REFERENCE TO RELATED APPLICATION(S)

This application is a 35 U.S.C. § 371 National Phase Entry Application from PCT/EP2019/075306, filed Sep. 20, 2019, designating the United States, and also claims the benefit of International Application No. PCT/CN2018/107717, filed Sep. 26, 2018, the disclosures of which are incorporated herein by reference in their entirety.

TECHNICAL FIELD

The present invention generally relates to wireless communication networks, and particularly relates to improvements to uplink operation on unlicensed spectrum.

BACKGROUND INFORMATION

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Protocol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities UE, E-UTRAN, and EPC and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{L}RB$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

One of the solutions for low latency data transmission is shorter transmission time intervals. For NR, in addition to transmission in a slot (such as for LTE, discussed above), a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, or other services.

In Rel-15 NR, a UE can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N^{size}_{BWPi}-1$, where i is the index of the carrier bandwidth part. A resource block (RB) is defined as 12 consecutive subcarriers in the frequency domain. Multiple OFDM numerologies, $\mu$, are supported in NR as given by Table 1 below where the subcarrier spacing, $\Delta f$, and the cyclic prefix for a carrier bandwidth part are configured by different higher-layer parameters for downlink and uplink.

TABLE 1

Supported NR transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring back to the earlier discussion about physical channels, in general, a UE determines its RB assignment in frequency domain for PUSCH or PDSCH using the resource allocation field in the detected DCI carried in PDCCH. In NR, two frequency resource allocation schemes, type 0 and type 1, are supported for PUSCH and PDSCH. The type to use for a PUSCH/PDSCH transmission can be defined by an RRC-configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall (upon detection of PDCCH intended for the UE) determine first the uplink/downlink carrier bandwidth part and then the resource allocation within the carrier bandwidth part.

In NR, DCI can be received over the PDCCH, which can carry DCI in messages with different formats. For example, DCI formats 0_0 and 0_1 are used to convey UL grants to the UE for transmission on PUSCH, while DCI formats 1_0 and 1_1 are used to convey DL grants for transmission on PDSCH. Other DCI formats (2_0, 2_1, 2_2 and 2_3) are used for other purposes including transmission of slot format information, reserved resource, transmit power control information, etc.

Currently, an NR slot consists of 7 or 14 symbols for SCS≤60 kHz, and 14 symbols for SCS>60 kHz. FIG. 4 shows an exemplary NR slot configuration comprising 14 OFDM symbols, where the slot and symbols durations are denoted $T_s$ and $T_{symb}$, respectively. In addition, NR also defines a Type-B scheduling, also known as "mini-slots." These are shorter than slots, typically ranging from 1-2 symbols up to one less than the number of symbols in a slot, and can start at any symbol. Mini-slots can be used if the transmission duration of a slot is too long or the occurrence of the next slot start (slot alignment) is too late. Applications of mini-slots include, e.g., latency-critical transmissions (in which both mini-slot length and mini-slot frequency are important), and unlicensed spectrum. FIG. 5 shows an exemplary two-symbol NR minislot.

Operation in unlicensed spectrum shared by various wireless communication systems is an important performance requirement of NR. This feature is often referred to as NR-U. Harmonious spectrum sharing with acceptable complexity for both standardization and system design is necessary and/or preferred for NR-U to ensure different systems can coexist well. At early phases, 5-GHz unlicensed spectrum is a particular focus in specification and system design.

For a node or device to be allowed to transmit in unlicensed spectrum (e.g., 5-GHz band), it typically needs to perform a clear channel assessment (CCA), also referred to as a listen-before-talk (LBT) procedure. This procedure can include sensing the medium (or channel) as idle for some time interval, which can be done in various ways including energy detection, preamble detection, or virtual carrier sensing. If the channel is determined to be unavailable, the node or device shall not access the channel. After sensing the channel idle, a node is typically allowed to transmit for a certain amount of time, referred to as transmission opportunity (TXOP). The length of the TXOP depends on regulation and type of LBT that has been performed, but typically ranges from 1 ms to 10 ms.

The current LBT procedures for IEEE 802.11 WiFi and LTE licensed assisted access (LAA) are defined according to the spectrum regulatory policies. Even so, to facilitate regulatory alignment and ease of deployment, it is expected that unlicensed operation of NR-U shall be subject to similar rules, procedures, and operational requirements as LTE LAA. Even so, NR mini-slots allow a node or device to access the channel at much more granular time intervals compared to LTE licensed assisted access (LAA), in which the channel could only be accessed every 500 us. With 60 kHz SCS and a two-symbol mini-slot in NR, for example, the channel can be accessed at 36 μs intervals. These intervals are also referred to as "transmission time interval" or "TTI" for short.

FIG. 6 shows an exemplary arrangement for scheduling uplink (UL) data transmissions over a 100-MHz unlicensed carrier in 5 GHz band. This 100-MHz carrier comprises 5 channels, each with 20-MHz bandwidth. Each channel is also referred to as a "LBT bandwidth piece." After receiving the UL scheduling grant (e.g., via DCI) indicating resources that can potentially cover the entire 100-MHz carrier, the device (also referred to as UE) performs LBT for each 20-MHz channel individually. As shown in FIG. 6, LBT can occur in the same TTI as UL grant reception. In subsequent TTIs, the UE performs UL data transmission, based on the grant, over the channels that are determined to be available via LBT. In the example shown in FIG. 6, all five (5) channels are determined to be available via LBT. However, this is only for purposes of explanation, and the skilled person will recognize that fewer than five channels can be available depending on the contemporaneous channel conditions.

Although the LBT procedure discussed above provides various advantages for NR-U operation in unlicensed bands, it also introduces various issues, problems, and/or drawbacks with respect to performing data transmissions after determining one or more channels are idle.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for selecting logical channels for transmission on granted uplink (UL) resources within a cell of a radio access network (RAN). The exemplary methods and/or procedures can be performed by user equipment (e.g., UE, wireless device, IoT device, modem, etc. or component thereof) in communication with a network node (e.g., base stations, eNBs, gNBs, etc., or components thereof) configured to serve the cell in the RAN.

These exemplary methods and/or procedures can include receiving, from a network node in the RAN, a grant of resources associated with a carrier frequency in unlicensed spectrum, the carrier frequency comprising a plurality of radio channels. The exemplary methods and/or procedures can also include selecting one or more of a plurality of logical channels for transmission during a subsequent transmission time interval (TTI) using the granted resources, wherein the selecting is based on respective priorities associated with the logical channels and information indicating respective states such as an availability, a load, and/or a radio quality of the radio channels.

In some embodiments, the plurality of logical channels comprises one or more medium access control (MAC) logical data channels and one or more MAC control elements (CEs).

In an embodiment, a certain level of priority is associated to each logical channel such that the logical channels can be listed in an order of their respective priorities.

By way of example, the following (seven) logical channels can be listed (with the highest priority listed first):
  C-RNTI MAC CE or data from UL-CCCH (priority 1);
  Configured Grant Confirmation MAC CE (priority 2);
  MAC CE for BSR, with exception of BSR included for padding (priority 3);
  Single Entry PHR MAC CE or Multiple Entry PHR MAC CE (priority 4);
  data from any Logical Channel, except data from UL-CCCH (priority 5);
  MAC CE for Recommended bit rate query (priority 6);
  MAC CE for BSR included for padding (priority 7).

In an embodiment, the plurality radio channels are associated each to a plurality of availability state (with respect to availability, channel load and/or radio quality). The states may comprise a first state and a second state, wherein the first state may have a higher availability, a lower load and/or a higher radio quality compared to the second state. The UE may determine the selection such that data of a first logical channel with a higher priority compared to a second logical channel is transmitted over a first radio channel associated to the first state and data of a second logical channel with a lower priority compared to the first logical channel is transmitted over a second radio channel associated to the second state.

In some embodiments, the exemplary methods and/or procedures can also include receiving, from the network node, the information indicating the respective availability states (availability, radio quality) of the radio channels. In an embodiment, the information comprises respective indications of whether each logical channel is selectable for the particular radio channel. In some embodiments, the information can be received via one of the following: dedicated RRC signaling, common RRC signaling, MAC control element (CE), and downlink control indicator (DCI).

In an embodiment, the UE determines the availability states of the radio channels by performing measurements with respect to channel load and or radio quality.

In some embodiments, the exemplary methods and/or procedures can include performing a listen-before-talk (LBT) procedure to determine the respective states (e.g. availabilities) of the radio channels. In some embodiments, the exemplary methods and/or procedures can also include determining a channel quality associated with each of the radio channels.

Other exemplary embodiments of the present disclosure include methods and/or procedures for configuring user equipment (UE) selection of logical channels for transmission on granted uplink (UL) resources within a cell of a radio access network (RAN). The exemplary method and/or procedure can be performed by a network node (e.g., base station, eNB, gNB, etc., or component thereof) configured to serve the cell, in communication with user equipment (e.g., UE, wireless device, IoT device, modem, etc. or component thereof).

These exemplary methods and/or procedures can include determining respective availabilities of a plurality of radio channels comprising a carrier frequency in unlicensed spectrum. The exemplary methods and/or procedures can also include transmitting, to a user equipment (UE), information indicating whether each of a plurality of logical channels is selectable for transmission on each of the radio channels. In some embodiments, the information can be transmitted via one of the following: dedicated RRC signaling, common RRC signaling, MAC control element (CE), and downlink control indicator (DCI). In some embodiments, the plurality of logical channels can comprise one or more medium access control (MAC) logical data channels and one or more MAC CEs.

The exemplary methods and/or procedures can also include transmitting, to the UE, a grant of resources for transmission of data associated with at least a portion of the logical channels, wherein the resources are associated with the plurality of radio channels. In some embodiments, the exemplary methods and/or procedures can also include receiving, from the UE on a subset of the radio channels comprising the carrier frequency, data associated with logical channels that were indicated as selectable for transmission on the subset of the radio channels.

Other exemplary embodiments include network nodes (e.g., radio base station(s), eNBs, gNBs, CU/DU, controllers, etc.) or user equipment (e.g., UE, wireless devices, IoT devices, or components thereof, such as a modem) configured to perform operations corresponding to various ones of the exemplary methods and/or procedures described above. Other exemplary embodiments include non-transitory, computer-readable media storing program instructions that, when executed by at least one processor, configure such network nodes or such UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

As briefly mentioned above, although the LBT procedure facilitates NR-U operation in unlicensed bands, it also introduces various issues, problems, and/or drawbacks with respect to performing data transmissions after determining one or more channels are idle. This is discussed in more detail below.

Figures 7, 8:
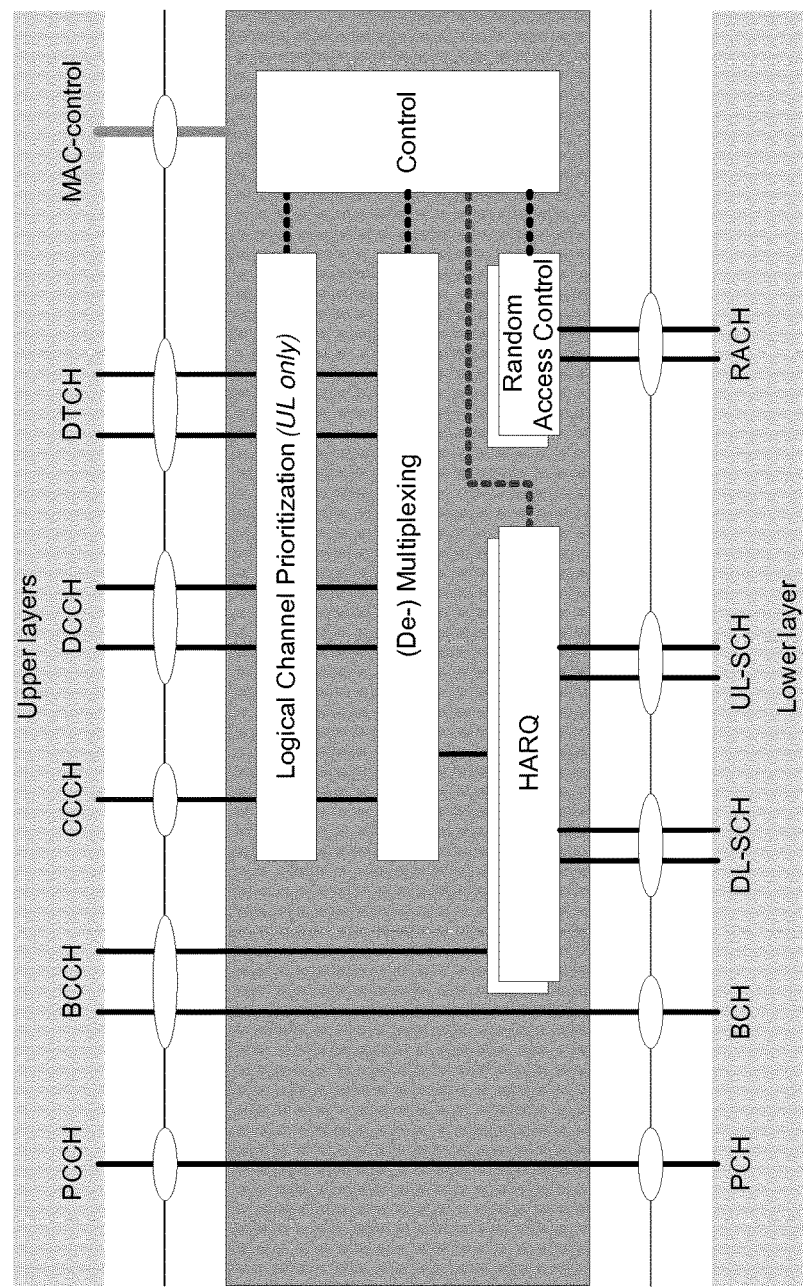
FIG. 7 shows a high-level block diagram of the NR MAC layer, as specified in 3GPP TS 38.321.
FIG. 8 illustrates an exemplary bitmap used to convey allowedChannels for the exemplary unlicensed channel arrangement shown in FIG. 6, according to one or more exemplary embodiments of the present disclosure.

FIG. 7 shows a high-level block diagram of the NR MAC layer, as specified in 3GPP TS 38.321. As shown in FIG. 7, the MAC layer provides data transfer and radio-resource allocation services to upper layers, and expects various services from the layer below, i.e., PHY layer. The upper layer interface consists of the various logical channels shown in FIG. 7, whereas the lower-layer interface consists of the various transport channels shown. As such, one of the functions of the MAC layer is mapping between the logical channels and the transport channels. More specifically, in the UL direction, the MAC layer multiplexes MAC service data units (SDUs) from one or more logical channels with control elements (CEs) onto transport blocks (TB) to be delivered to the PHY via the respective transport channels. For example, the UL-SCH transport channel delivers TBs to the PHY for transmission on PUSCH. In addition, the MAC layer provides logical channel prioritization when mapping the MAC SDUs to available TB block capacity.

In general, for UL transmission in unlicensed spectrum, a UE prepares a MAC protocol data unit (PDU) and finishes the encoding at the end of the LBT procedure. When the channel is determined to be available, the UE maps the encoded data to the radio resources and performs the data signal transmission on the available channel. However, since unlicensed channel availability is only known at the end of the LBT procedure and the data transmission starts immediately thereafter, the UE has insufficient time to reconstruct and re-encode the MAC PDU if some of the unlicensed spectrum (e.g., one or more of the five channels shown in FIG. 6) are found to be unavailable via LBT.

When constructing a MAC PDU, the MAC entity shall include the data in the MAC PDU according to the preconfigured and/or predefined logical channel priority (LCP) order, which is described in 3GPP TS 38.321 § 5.4.3. More specifically, logical channels shall be prioritized in accordance with the following order (listed in decreasing priority):

C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
data from any Logical Channel, except data from UL-CCCH;
MAC CE for Recommended bit rate query; and
MAC CE for BSR included for padding.

When a UE is scheduled (e.g., via an UL grant) for one PUSCH transmission using several unlicensed channels (e.g., the five 20-MHz channels shown in FIG. 6), an LBT procedure can determine that not all assigned channels are available. In the current NR MAC LCP procedure, the load and/or congestion status of each channel assigned in the UL grant is not taken into consideration. In such case, if the UE has already mapped higher-priority MAC CEs and data to channels later determined to be unavailable, this high-priority information may be blocked from transmission during the TTIs following the LBT. Instead, lower-priority data and CEs mapped to available channels will be transmitted. Accordingly, the higher priority data and CEs will be delayed at least until the UE receives a new UL grant from the serving base station (e.g., gNB) and determines channel availability via LBT. This additional latency would negatively impact the quality of service (QoS) required for high priority data and CEs.

In addition, even if all channels are available, the various available channel can have different radio quality. In general, channels with lower quality require use of a less-efficient modulation and coding scheme (MCS) and/or increased number retransmissions compared to higher-quality channels. Currently, channel radio quality is not considered during the MAC LCP procedure. As such, when higher-priority data and CEs are mapped to an unlicensed channel with poor radio quality, such information may not be received correctly during the TTIs following the LBT, and thus may require a subsequent UL grant for finishing transmission or for re-transmission after decoding error. Again, this additional latency would negatively impact the quality of service (QoS) required for high priority data and CEs.

Accordingly, certain exemplary embodiments of the present disclosure consider the unlicensed channel occupancy and/or quality during the MAC LCP procedure, whereby data associated with higher-priority logical channels and/or higher-priority MAC CEs can be mapped to an available unlicensed channel with lower load and better radio quality, thereby improving transmission reliability and reducing the risk of latency. In contrast, lower-priority logical channels and/or lower-priority MAC CEs can be mapped to an available unlicensed channel with higher load and lesser radio quality.

In other exemplary embodiments of the present disclosure, the UE PHY layer maps the MAC SDUs associated with the respective transport channels to the unlicensed radio channels, so that the MAC SDUs associated with higher-priority logical channels can be mapped to an unlicensed radio channel with lower load and better radio quality, thereby improving transmission reliability and reducing the risk of latency. In the same manner, lower-priority logical channels and/or lower-priority MAC CEs can be mapped to an available unlicensed channel with higher load and lesser radio quality.

In this manner, such exemplary embodiments provide various benefits and/or advantages including facilitating the ability to serve URLLC traffic using unlicensed spectrum. Although embodiments are described in the context of NR-U, such embodiments can also provide similar benefits when applied to other unlicensed spectrum technologies.

As compared to LTE, NR includes Code Block Groups (CBGs) which essentially divide a MAC-layer transport block (TB) into smaller groups. For UL transmissions, each CBG is decoded individually by the gNB, which also provides HARQ feedback for each individual CBG. This is particularly advantageous for very large Transport Block Sizes (TBS), as anticipated for NR applications. Assuming an example of dividing a TB into three CBGs, if only one CBG is decoded incorrectly (as indicated, e.g., by a NACK from gNB), the UE must only retransmit that one failed CBG rather than the entire TB. This technique can effectively reduce the overhead of retransmissions and improve the spectral efficiency.

In the following description, it is assumed that interlacing across unlicensed channels is not used and/or applied. As such, for every PUSCH transmission, the UE is able to determine a particular mapping between data from different logical channels and/or services and the unlicensed channels scheduled by the UL grant. In other words, assuming no interlacing, an unlicensed channel can carry all encoded data symbols within a particular CBG. Nevertheless, embodiments described herein are also applicable to different configurations using different types of channels, carriers, channel coding, data mapping, etc. For example, different scheduled channels may belong to the same carrier or the same BWP of a carrier, just as the scheduled channels may be across different carriers or different BWPs.

In some embodiments, for transmissions in unlicensed spectrum (e.g., NR-U), the LCP procedure at the MAC layer can be performed subject to an additional restriction regarding the mapping to radio channels associated with the UL grant. For example, this additional restriction that sets the allowed channel(s) for transmission can be called allowedChannels and can be signaled to the UE in various ways including, e.g., via common or dedicated RRC signaling, a CE from the MAC peer, and/or an indicator in PDCCH. As currently specified in 3GPP TS 38.321 section 5.4.3.1.2, the MAC entity shall, when a new transmission is performed:

1> select the logical channels for each UL grant that satisfy all of the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to TRUE in case the UL grant is a Configured Grant Type 1; and
    2> allowedServingCells, if configured, includes the Cell information associated to the UL grant.

In general, logical channels selected according to this LCP procedure are allocated resources from the UL grant in a decreasing priority order, so long as a selected logical channel has not exceeded its prioritized bit rate (PBR). According to exemplary embodiments, the above MAC LCP procedure can also be performed subject to satisfying the additional following requirement:
    2> allowedChannels, if configured, includes the channel information associated to the UL grant.

For example, allowedChannels can be configured (e.g., by the gNB) in such a way that the MAC logical channels and/or CEs with higher priority can be mapped to the unlicensed channels with lower channel occupancy and/or better radio quality, the MAC logical channels and/or CEs with higher priority can be mapped to the unlicensed channels with higher channel occupancy and/or worse channel quality. More generally, allowedChannels can be configured in such a way that there is an inverse relationship between the priority level of MAC logical channels and/or CEs and occupancy level of unlicensed channels to which they are mapped. Likewise, allowedChannels can be configured in such a way that there is a direct relationship between the priority level of MAC logical channels and/or CEs and the quality level of unlicensed channels to which they are mapped.

Furthermore, since the channel occupancy and channel radio quality may vary from time to time, in some embodiments the gNB can reconfigure allowedChannels accordingly. The reconfiguration can be carried via RRC signaling or a MAC CE. In addition, various exemplary formats can be used to convey allowedChannels for configuration and/or reconfiguration. For example, FIG. 8 illustrates an exemplary bitmap used to convey allowedChannels for the exemplary unlicensed channel arrangement shown in FIG. 6. In this bitmap, eight (8) bits are provided for each of the five unlicensed channels, with each bit indicating whether a particular MAC logical channel (LCH) or CE can ("1") or cannot ("0") be mapped to that unlicensed channel. The number of bits and particular bit values shown in the figure are merely exemplary.

In various embodiments, the configuring network node (e.g., gNB) can determine allowedChannels configuration in various ways. For example, the network node can determine the actual state (such as availability and/or quality) of the various unlicensed channels comprising the carrier(s) based on the results of its own LBT procedures. In addition, the network node can determine the state (availability and/or quality) of the various unlicensed channels based on channel quality reports from various UEs served by the network. These reports can be based on the UEs' own LBT procedures, for example.

In other embodiments, for transmissions in unlicensed spectrum (e.g., NR-U), the UE PHY layer can map the MAC SDUs associated with the respective transport channels to the unlicensed radio channels without any configuration by the network (e.g., allowedChannels discussed above is not provided). In such embodiments, if the UE determines based on LBT procedure that at least one scheduled unlicensed channel is available for the subsequent TTI(s), the UE PHY layer maps the encoded data blocks (or CBGs) to the available unlicensed channels in decreasing order of priority levels of the logical channels and/or CEs comprising the respective data blocks or CBGs.

In some embodiments, priority levels of the respective data blocks or CBGs can be determined according to the logical channel priority (section 5.4.3.1.2) and/or the resource allocation priority (section 5.4.3.1.3) defined in 3GPP TS 38.321. In such case, the PHY layer can be informed (e.g., by the MAC layer) or can infer the location of respective CEs and data from respective logical channels within the data blocks or CBGs comprising the MAC PDU provided in the TB.

In some embodiments, the priority of data blocks is determined according to the order of the data placement in the MAC PDU. For example, data placed in the beginning (or head) portion of the MAC PDU is determined to be associated with the highest priority of the logical channels and/or CEs. Data in subsequent portions of the MAC PDU is determined to have a reduced priority level according to its displacement from the beginning of the MAC PDU. More generally, in such embodiments, data priority level is determined in direct proportion to its displacement from the beginning portion of the MAC PDU or TB.

In other embodiments, data priority level can be determined in inverse proportion to its displacement from the beginning portion of the MAC PDU or TB, or, alternately, in direct proportion to its displacement from the end (or tail) portion of the MAC PDU or TB. For example, the data blocks or CBGs at the tail of a MAC PDU are determined to have greater priority than the data blocks or CBGs located in the middle of the MAC PDU, which in turn are determined to have greater priority that the ones located in the head of the MAC PDU. These embodiments can be advantageously utilized in NR, where high-priority MAC CEs such as BSR and PHR may be placed at the end of the MAC PDU.

Figure 6:
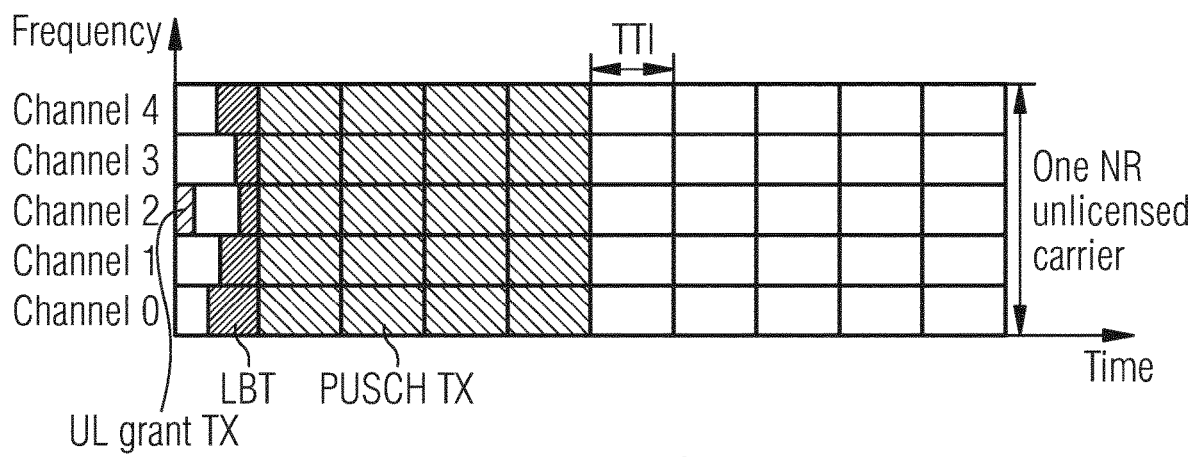
FIG. 6 shows an exemplary arrangement for scheduling uplink data transmissions over a 100-MHz unlicensed carrier in 5-GHz band, according to various exemplary embodiments.
Figure 9:
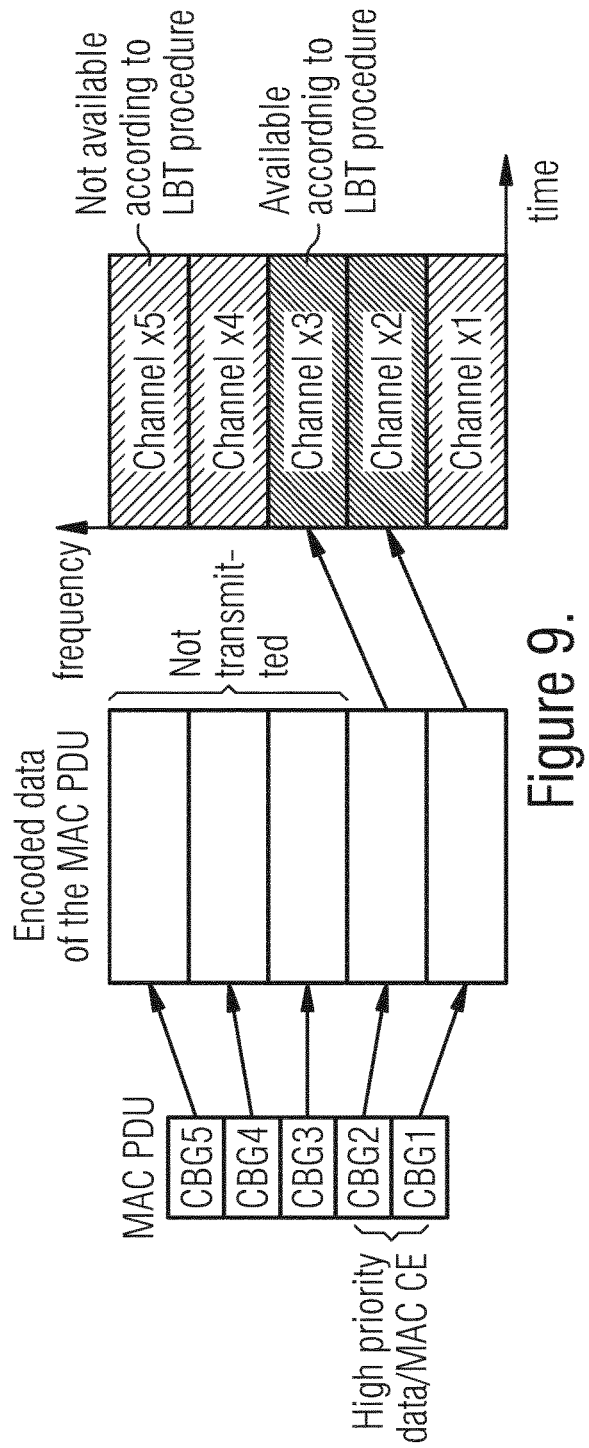
FIGS. 9-11 show various exemplary mappings of one MAC PDU scheduled for transmission on an unlicensed carrier comprising five channels (e.g., as shown in FIG. 6), according to various exemplary embodiments of the present disclosure.

FIG. 9 shows an exemplary mapping of one MAC PDU scheduled for transmission on an unlicensed carrier comprising five channels (e.g., as shown in FIG. 6), according to various exemplary embodiments of the present disclosure. In FIG. 9, the first two CBGs (i.e., CBG1 and CBG2) carry high-priority MAC logical channels and/or CEs, and consequently are mapped to the Channels x2 and x3, determined to be available (e.g., not occupied) during the subsequent TTIs according to the LBT procedure. In contrast, even though channels 1 and 4-5 were allocated in the UL grant, they are determined to be unavailable (e.g., occupied) during LBT, and consequently are not used to carry any of the lower-priority MAC logical channels and/or CEs during the subsequent TTIs.

Figure 10:
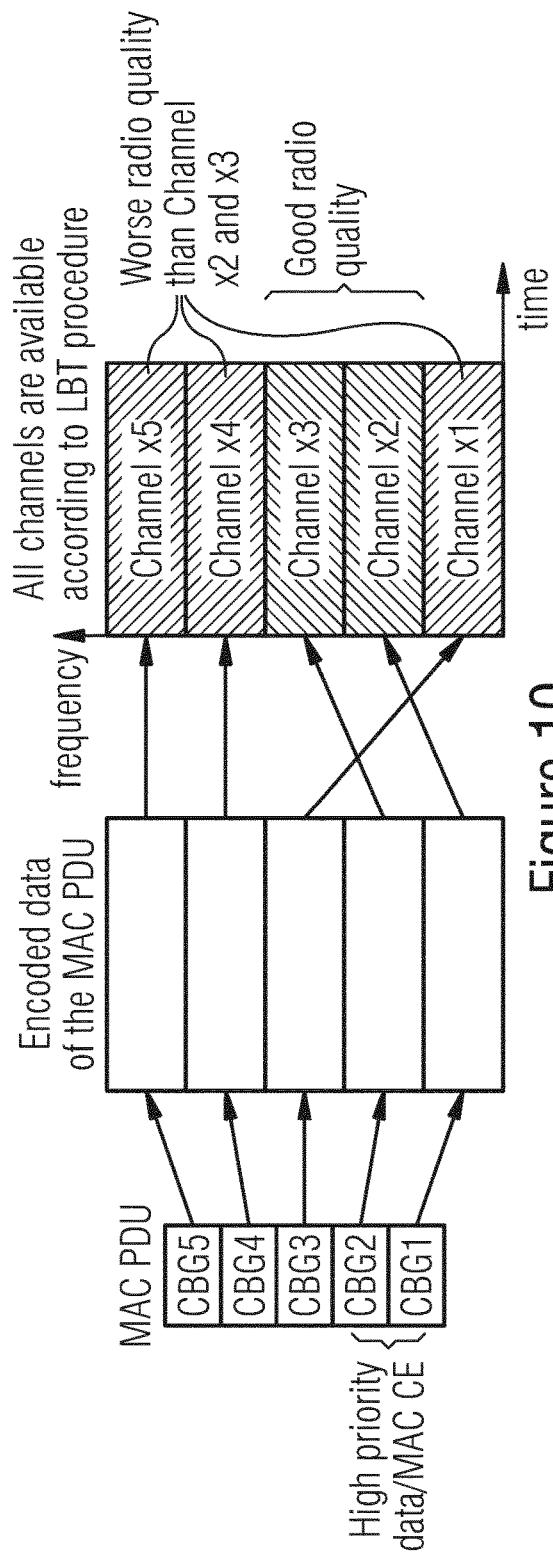

In some embodiments, if more than one scheduled channel is determined to be available according to the LBT procedure, the UE PHY layer can map the MAC SDUs associated with the respective transport channels to the unlicensed radio channels further based on the quality levels of the respective schedule channels. For example, the UE PHY layer can map the blocks (or CBGs) comprising high priority data and/or MAC CE to the available channels with good radio quality. In such embodiments, per-block (or per-CBG) priority level can be determined in the same or similar manner as discussed above with respect to other embodiments. FIG. 10 shows an exemplary mapping of one MAC PDU scheduled for transmission on an unlicensed carrier comprising five channels (e.g., as shown in FIG. 6), according to these embodiments. As shown in FIG. 10, MAC logical channel data and CEs with higher priority are mapped to available (e.g., non-occupied) channels good radio quality.

Figure 11:
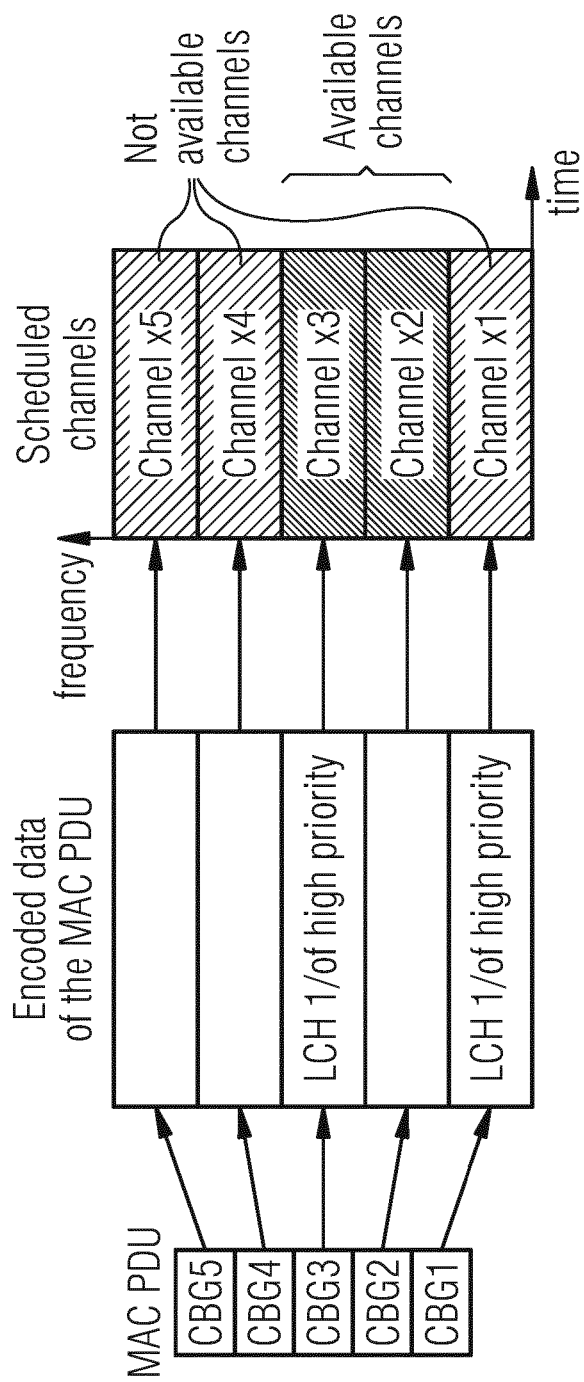

In some embodiments, once code block (or CBG) priority level is determined, higher-priority data can be replicated and/or duplicated in multiple code blocks or CBGs assigned to different channels, thereby providing increased error protection for higher-priority data through increased redundancy and diversity. FIG. 11 shows an exemplary mapping of one MAC PDU scheduled for transmission on an unlicensed carrier comprising five channels (e.g., as shown in FIG. 6), according to these embodiments. In this example, the highest-priority logical channel data (i.e., LCH 1) is configured to be duplicated and carried in both CBG1 and CBG3, where CBG1 and CBG3 are mapped to Channels x1 and x3 respectively. According to the LBT procedure, only Channels x2 and x3 are available. Although CBG1 is not transmitted on Channel x1 due to LBT determination of unavailability, the data of LCH1 can still be transmitted on Channel x3.

In some embodiments, data duplication across channels can be configured in a similar manner as the allowedChannels MAC-layer LCP restriction discussed above. For example, a bitmap similar to the one shown in FIG. 8 for allowedChannels can be provided. In these embodiments, the values of "1" for each LCH/CE indicates the particular channels in which data associated with that LCH/CE can be duplicated. In the example of FIG. 11, such a bitmap can indicate that data from high-priority LCH 1 can be duplicated in Channels x1 and x3. Such embodiments can be used independent of a configuration of allowedChannels by the network, (e.g., together with PHY layer embodiments).

In other embodiments, data duplication can be used together with allowedChannels, otherwise, not apply the restriction allowedChannels to the associated LCHs. For example, when the duplication across channels is enabled, apply the restriction allowedChannels to the associated logical channels and/or CEs; otherwise, do not apply the restriction allowedChannels to the associated logical channels and/or CEs.

Figure 12:
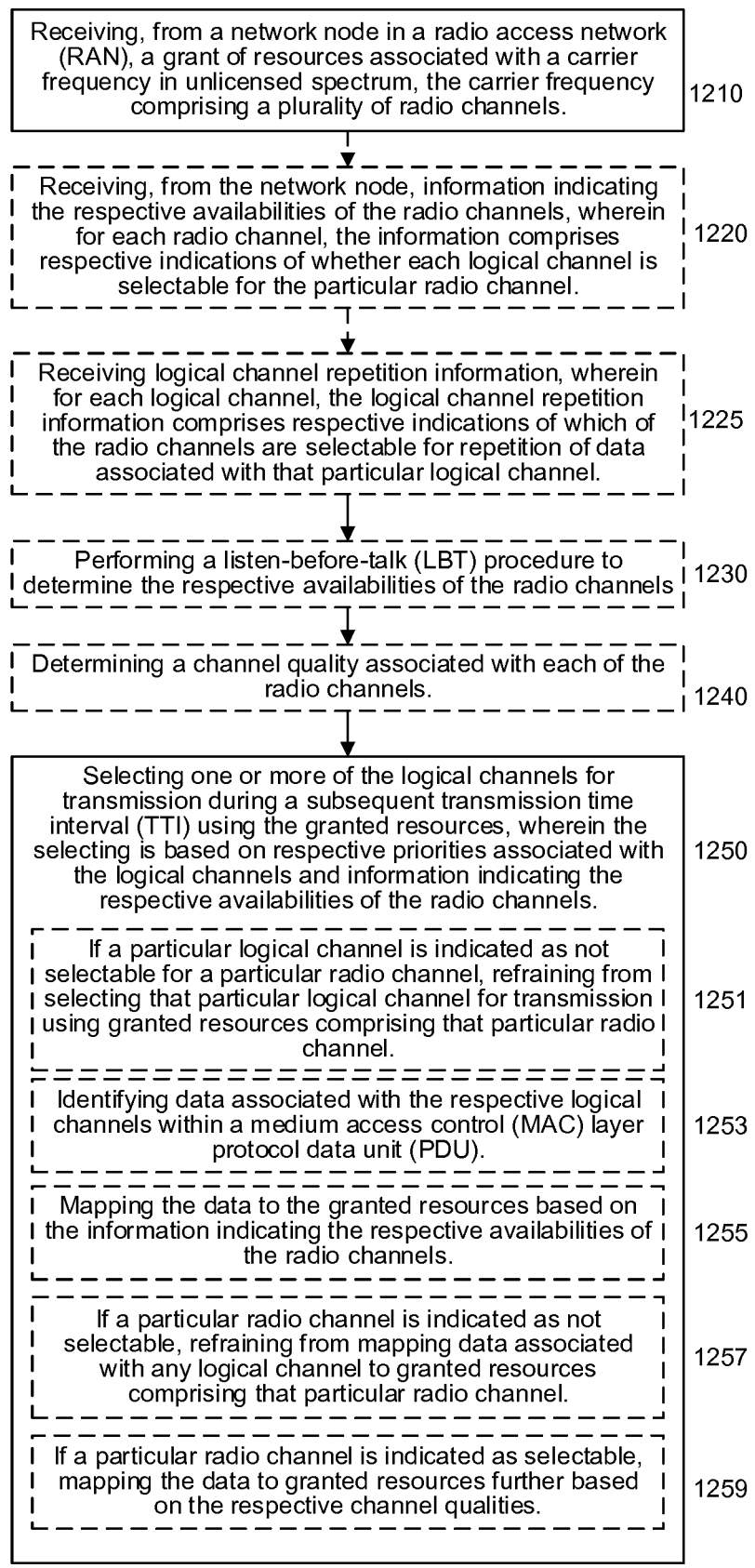
FIG. 12 shows a flow diagram of an exemplary method and/or procedure performed by a user equipment (UE), according to various exemplary embodiments of the present disclosure.

FIG. 12 shows a flow diagram of an exemplary method and/or procedure for transmitting information on an uplink (UL) shared channel within a cell of a radio access network (RAN). The exemplary method and/or procedure can be performed by a user equipment (e.g., UE, wireless device, IoT device, modem, etc. or component thereof) in communication with a network node (e.g., base stations, eNBs, gNBs, etc., or components thereof) configured to serve the cell in the RAN. For example, the exemplary method and/or procedure shown in FIG. 12 can be implemented, for example, in a UE or device configured according to FIG. 14 (described below). Furthermore, the exemplary method and/or procedure shown in FIG. 12 can be utilized cooperatively with the exemplary method and/or procedures shown in FIG. 13 (described below), to provide various exemplary benefits described herein. In addition, although FIG. 12 shows blocks in a particular order, this order is merely exemplary, and the operations of the exemplary method and/or procedure can be performed in a different order than shown in FIG. 12 and can be combined and/or divided into blocks having different functionality. Optional blocks or operations are shown by dashed lines.

Exemplary embodiments of the method and/or procedure illustrated in FIG. 12 can include the operations of block 1210, where the UE can receive, from a network node in the RAN, a grant of resources associated with a carrier frequency in unlicensed spectrum, the carrier frequency comprising a plurality of radio channels.

The exemplary method and/or procedure can also include the operations of block 1250, where the UE can select one or more of a plurality of logical channels for transmission during a subsequent transmission time interval (TTI) using the granted resources, wherein the selecting is based on respective priorities associated with the logical channels and information indicating the respective availabilities of the radio channels. In some embodiments, the plurality of logical channels comprises one or more medium access control (MAC) logical data channels and one or more MAC control elements (CEs).

In some embodiments, the exemplary method and/or procedure can also include operations of block 1220, where the UE can receive, from the network node, the information indicating the respective availabilities of the radio channels, wherein for each radio channel, the information comprises respective indications of whether each logical channel is selectable for the particular radio channel. In some embodiments, this information can be received before the selecting operations comprising block 1250. In some embodiments, the information can be received via one of the following: dedicated RRC signaling, common RRC signaling, MAC control element (CE), and downlink control indicator (DCI).

In some embodiments, the exemplary method and/or procedure can also include operations of block 1225, where the UE can receive, from the network node, logical channel repetition information, wherein for each logical channel, the logical channel repetition information comprises respective indications of which of the radio channels are selectable for repetition of data associated with that particular logical channel. In some embodiments, the exemplary method and/or or procedure can also include operations of block 1230, where the UE can perform a listen-before-talk (LBT) procedure to determine the respective availabilities of the radio channels. In some embodiments, the exemplary method and/or procedure can also include operations of block 1240, where the UE can determine a channel quality associated with each of the radio channels.

In some embodiments, the operations of block 1250 can also include the operations of sub-block 1251, where if a particular logical channel is indicated as not selectable for a particular radio channel, the UE can refrain from selecting that particular logical channel for transmission using granted resources comprising that particular radio channel. In some embodiments, the operations of block 1250 can also include the operations of sub-blocks 1253-1255, where the UE can identify data associated with the respective logical channels within a medium access control (MAC) layer protocol data unit (PDU), and map the data to the granted resources based on the information indicating the respective availabilities of the radio channels. In some embodiments, mapping the data to granted resources can be further based on descending order of priority of the associated logical channels. In some embodiments, mapping the data to the granted resources can be further based on respective priorities associated with the logical channels. In some embodiments, mapping the data to the granted resources can be further based on the location of the data within the MAC PDU. In some embodiments, mapping the data to granted resources further comprises mapping the data associated with a particular logical channel to granted resources associated with all radio channels indicated as selectable for repetition.

In some embodiments, the operations of block 1250 can also include the operations of sub-block 1257, where if a particular radio channel is indicated as not selectable, the UE can refrain from mapping data associated with any logical channel to granted resources comprising that particular radio channel. In some embodiments, the operations of block 1250 can also include the operations of sub-block 1259, where if a particular radio channel is indicated as selectable, the UE can map the data to granted resources further based on the respective channel qualities.

In some embodiments, the exemplary method and/or procedure can be performed by the MAC layer of a UE. In some embodiments, the exemplary method and/or procedure can be performed by the PHY layer of a UE.

Figure 13:
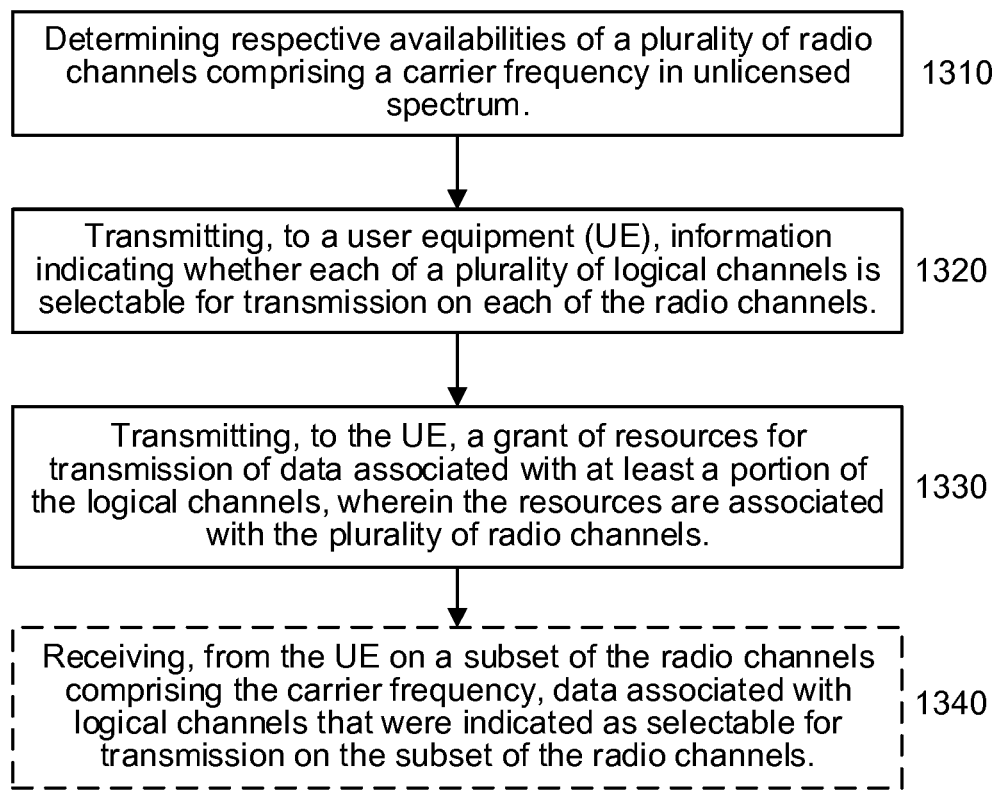
FIG. 13 shows a flow diagram of an exemplary method and/or procedure performed by a network node (e.g., base station, gNB, eNB, etc. or component thereof), according to various exemplary embodiments of the present disclosure.

FIG. 13 shows a flow diagram of an exemplary method and/or procedure for configuring user equipment (UE) selection of logical channels for transmission on granted uplink (UL) resources within a cell of a radio access network (RAN). The exemplary method and/or procedure can be performed by a network node (e.g., base station, eNB, gNB, etc., or component thereof) configured to serve the cell, in communication with user equipment (e.g., UE, wireless device, IoT device, modem, etc. or component thereof). For example, the exemplary method and/or procedure shown in FIG. 13 can be implemented in a network node configured according to FIG. 15 (described below). Furthermore, as explained below, the exemplary method and/or procedure shown in FIG. 13 can be utilized cooperatively with the exemplary method and/or procedures shown in FIG. 12 (described above), to provide various exemplary benefits described herein. In addition, although FIG. 13 shows blocks in a particular order, this order is merely exemplary, and the operations of the exemplary method and/or procedure can be performed in a different order than shown in FIG. 13 and can be combined and/or divided into blocks having different functionality. Optional blocks or operations are shown by dashed lines.

Exemplary embodiments of the method and/or procedure illustrated in FIG. 13 can include the operations of block 1310, where the network node can determine respective availabilities of a plurality of radio channels comprising a carrier frequency in unlicensed spectrum. The exemplary method and/or procedure can also include operations of block 1320, where the network node can transmit, to a user equipment (UE), information indicating whether each of a plurality of logical channels is selectable for transmission on each of the radio channels. In some embodiments, the information indicating whether each of the logical channels is selectable can be based on the determined respective availabilities. In some embodiments, the information can be transmitted via one of the following: dedicated RRC signaling, common RRC signaling, MAC control element (CE), and downlink control indicator (DCI). In some embodiments, the plurality of logical channels can comprise one or more medium access control (MAC) logical data channels and one or more MAC CEs.

The exemplary method and/or procedure can also include operations of block 1330, where the network node can transmit, to the UE, a grant of resources for transmission of data associated with at least a portion of the logical channels, wherein the resources are associated with the plurality of radio channels. In some embodiments, the exemplary method and/or procedure can also include operations of block 1340, where the network node can receive, from the UE on a subset of the radio channels comprising the carrier frequency, data associated with logical channels that were indicated as selectable for transmission on the subset of the radio channels.

In some embodiments, the exemplary method and/or procedure can be performed by an NR base station (gNB).

Figure 14:
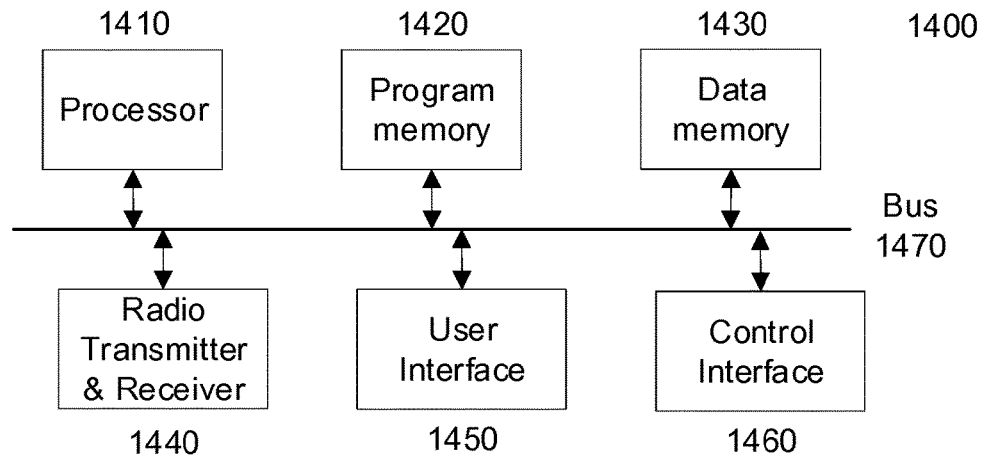
FIG. 14 is a block diagram of an exemplary wireless device or UE according to various exemplary embodiments.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 14 shows a block diagram of an exemplary wireless device or user equipment (UE) 1400 according to various embodiments of the present disclosure. For example, exemplary device 1400 can be configured by execution of instructions, stored on a computer-readable medium, to perform operations corresponding to one or more of the exemplary methods and/or procedures described above.

Exemplary device 1400 can comprise a processor 1410 that can be operably connected to a program memory 1420 and/or a data memory 1430 via a bus 1470 that can comprise parallel address and data buses, serial ports, or other methods and/or structures known to those of ordinary skill in the art. Program memory 1420 comprises software code or program executed by processor 1410 that facilitates, causes and/or programs exemplary device 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1440, user interface 1450, and/or host interface 1460.

For example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1420 can also comprises software code executed by processor 1410 to control the functions of device 1400, including configuring and controlling various components such as radio transceiver 1440, user interface 1450, and/or host interface 1460. Program memory 1420 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from device 1400, from which the instructions can be downloaded into program memory 1420 located within or removably coupled to device 1400, so as to enable execution of such instructions.

Data memory 1430 can comprise memory area for processor 1410 to store variables used in protocols, configuration, control, and other functions of device 1400, including operations corresponding to, or comprising, any of the exemplary methods and/or procedures described herein. Moreover, program memory 1420 and/or data memory 1430 can comprise non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed. Persons of ordinary skill in the art will recognize that processor 1410 can comprise multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of device 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1440 can comprise radio-frequency transmitter and/or receiver functionality that facilitates the device 1400 to communicate with other equipment supporting like wireless communication standards and/or protocols. In some exemplary embodiments, the radio transceiver 1440 includes a transmitter and a receiver that enable device 1400 to communicate with various 5G/NR networks according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, the radio transceiver 1440 includes an LTE transmitter and receiver that can facilitate the device 1400 to communicate with various LTE LTE-Advanced (LTE-A), and/or NR networks according to standards promulgated by 3GPP. In some exemplary embodiments of the present disclosure, the radio transceiver 1440 includes circuitry, firmware, etc. necessary for the device 1400 to communicate with various NR, NR-U, LTE, LTE-A, LTE-LAA, UMTS, and/or GSM/EDGE networks, also according to 3GPP standards. In some exemplary embodiments of the present disclosure, radio transceiver 1440 includes circuitry, firmware, etc. necessary for the device 1400 to communicate with various CDMA2000 networks, according to 3GPP2 standards.

In some exemplary embodiments of the present disclosure, the radio transceiver 1440 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, radio transceiver 1440 can comprise a transceiver that is capable of wired communication, such as by using IEEE 802.3 Ethernet technology. The functionality particular to each of these embodiments can be coupled with or controlled by other circuitry in the device 1400, such as the processor 1410 executing program code stored in program memory 1420 in conjunction with, or supported by, data memory 1430.

User interface 1450 can take various forms depending on the particular embodiment of device 1400, or can be absent from device 1400 entirely. In some exemplary embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the device 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1400 having a touch screen display are capable of receiving user inputs, such as inputs related to exemplary methods and/or procedures described herein or otherwise known to persons of ordinary skill in the art.

In some exemplary embodiments of the present disclosure, device 1400 can comprise an orientation sensor, which can be used in various ways by features and functions of device 1400. For example, the device 1400 can use outputs of the orientation sensor to determine when a user has changed the physical orientation of the device 1400's touch screen display. An indication signal from the orientation sensor can be available to any application program executing on the device 1400, such that an application program can change the orientation of a screen display (e.g., from portrait to landscape) automatically when the indication signal indicates an approximate 140-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the device 1400 can take various forms depending on the particular exemplary embodiment of device 1400 and of the particular interface requirements of other devices that the device 1400 is intended to communicate with and/or control. For example, the control interface 1460 can comprise an RS-232 interface, an RS-485 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the device 1400, including various exemplary methods and/or computer-readable media according to various exemplary embodiments of the present disclosure.

Figure 15:
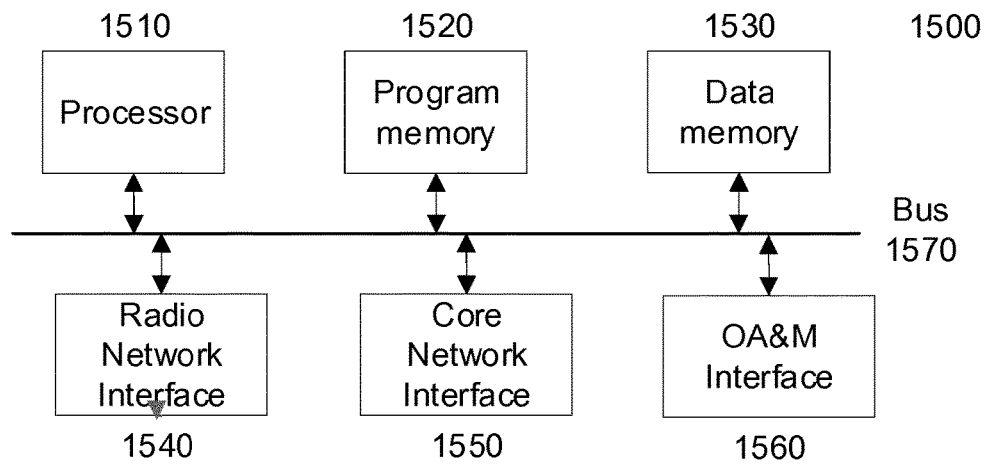
FIG. 15 is a block diagram of an exemplary network node according to various exemplary embodiments.

FIG. 15 shows a block diagram of an exemplary network node 1500 according to various embodiments of the present disclosure. For example, exemplary network node 1500 can be configured by execution of instructions, stored on a computer-readable medium, to perform operations corresponding to one or more of the exemplary methods and/or procedures described above. In some exemplary embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 comprises processor 1510 which is operably connected to program memory 1520 and data memory 1530 via bus 1570, which can comprise parallel address and data buses, serial ports, or other methods and/or structures known to those of ordinary skill in the art.

Program memory 1520 comprises software code (e.g., program instructions) executed by processor 1510 that can configure and/or facilitate network node 1500 to communicate with one or more other devices using protocols according to various embodiments of the present disclosure, including one or more exemplary methods and/or procedures discussed above. Program memory 1520 can also comprise software code executed by processor 1510 that can facilitate and specifically configure network node 1500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1540 and core network interface 1550. By way of example and without limitation, core network interface 1550 can comprise the S1 interface and radio network interface 1550 can comprise the Uu interface, as standardized by 3GPP. Program memory 1520 can further comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can comprise multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill in the art will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some embodiments, core network interface 1550 can comprise the NG interface standardized by 3GPP. In some exemplary embodiments, core network interface 1550 can comprise one or more interfaces to one or more SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
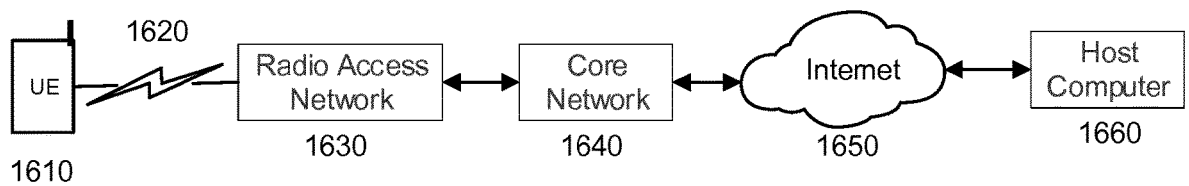
FIG. 16 is a block diagram of an exemplary network configured to provide over-the-top (OTT) data services between a host computer and a UE, according to various exemplary embodiments.

FIG. 16 is a block diagram of an exemplary communication network configured to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above. RAN 1630 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum.

Figure 1:
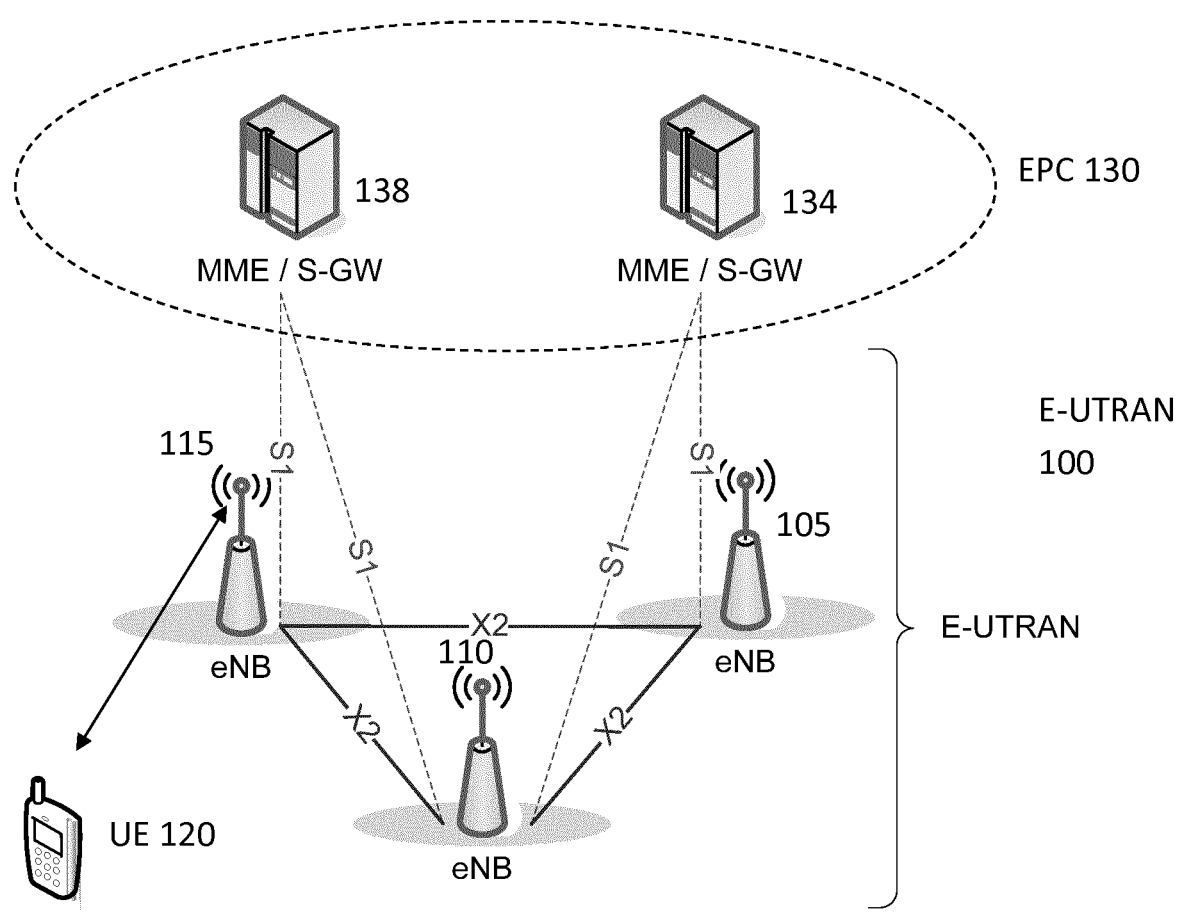
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
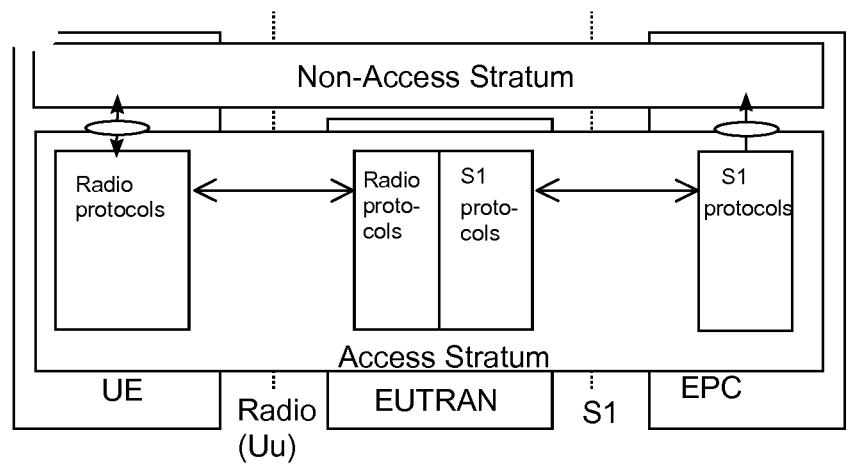
FIG. 2A is a high-level block diagram of an exemplary E-UTRAN architecture in terms of its constituent components, protocols, and interfaces.
Figure 2B:
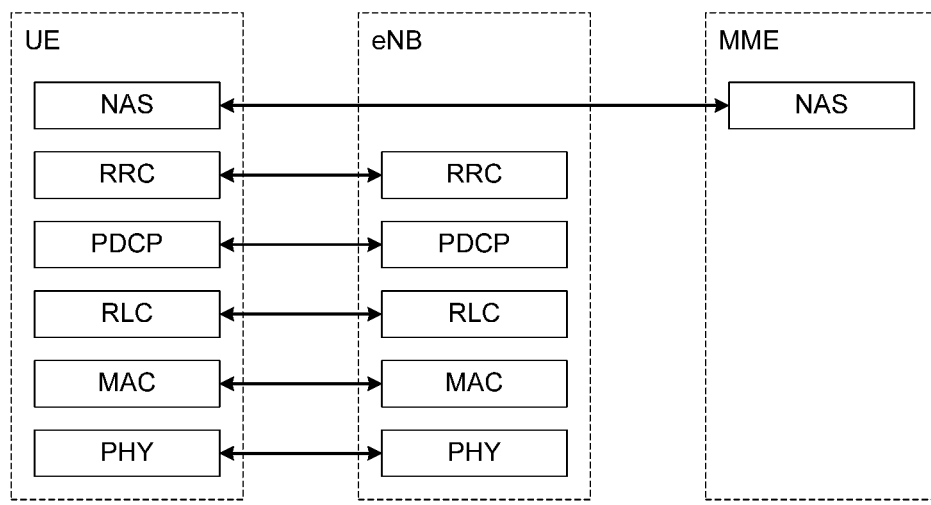
FIG. 2B is a block diagram of exemplary protocol layers of the control-plane portion of the radio (Uu) interface between a user equipment (UE) and the E-UTRAN.
Figure 2C:
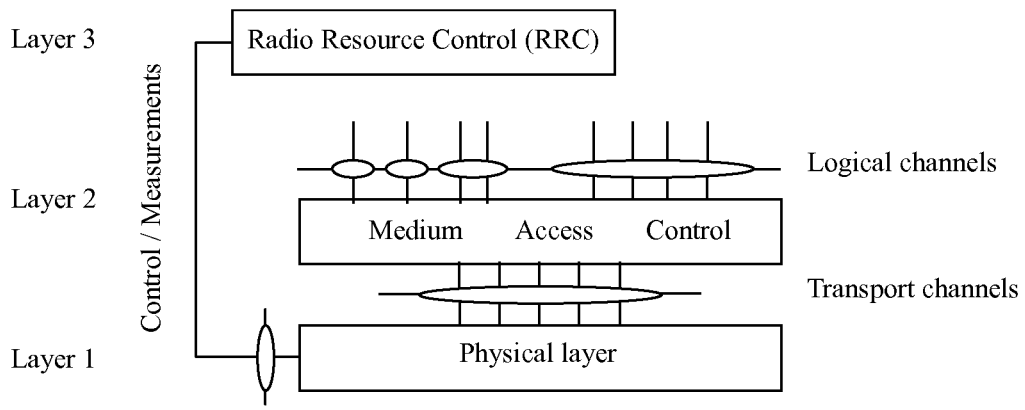
FIG. 2C is a block diagram of an exemplary LTE radio interface protocol architecture from the perspective of the PHY layer.
Figure 3A:
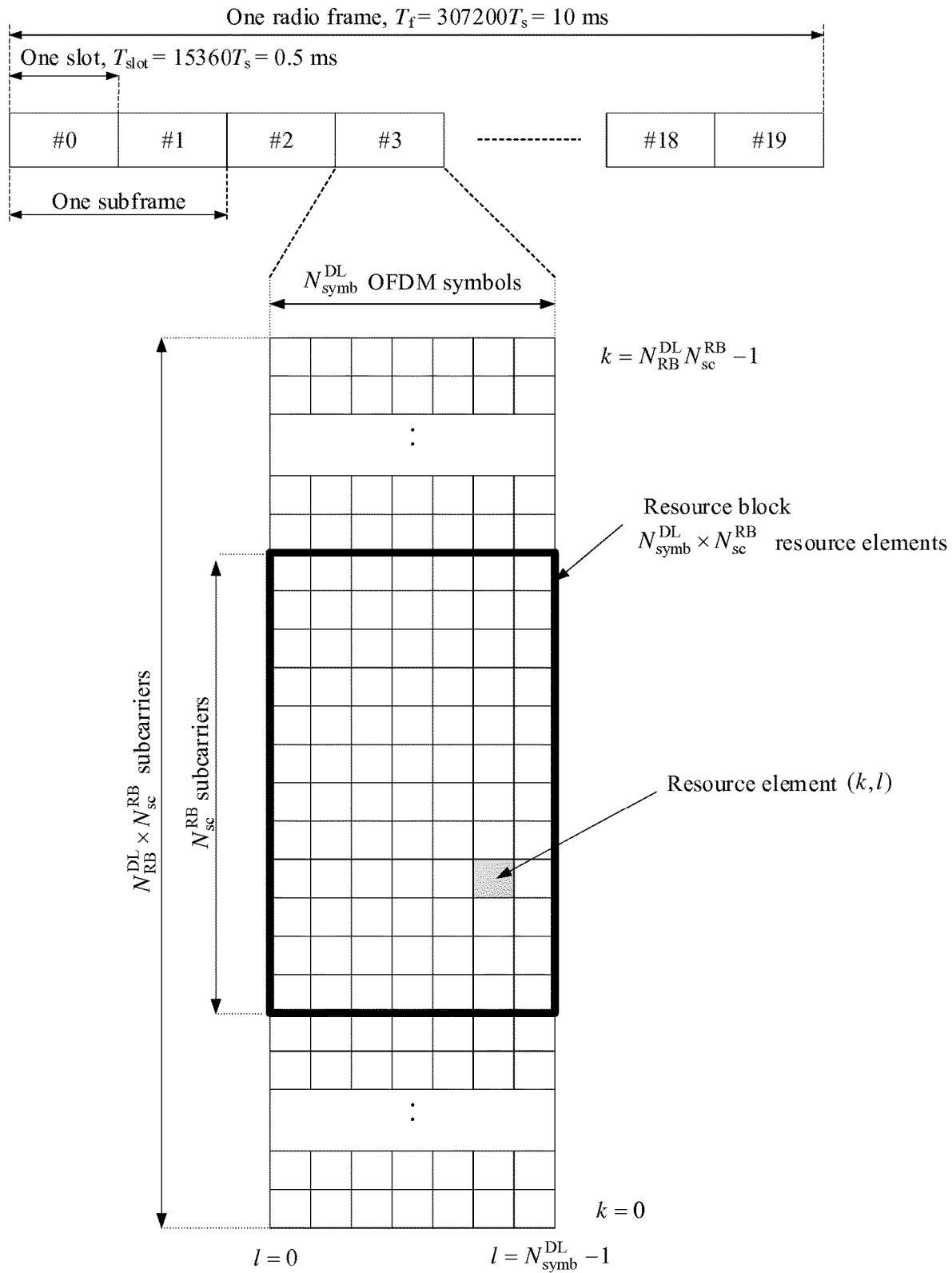
FIGS. 3A and 3B are block diagrams, respectively, of exemplary downlink and uplink LTE radio frame structures used for frequency division duplexing (FDD) operation.
Figure 3B:
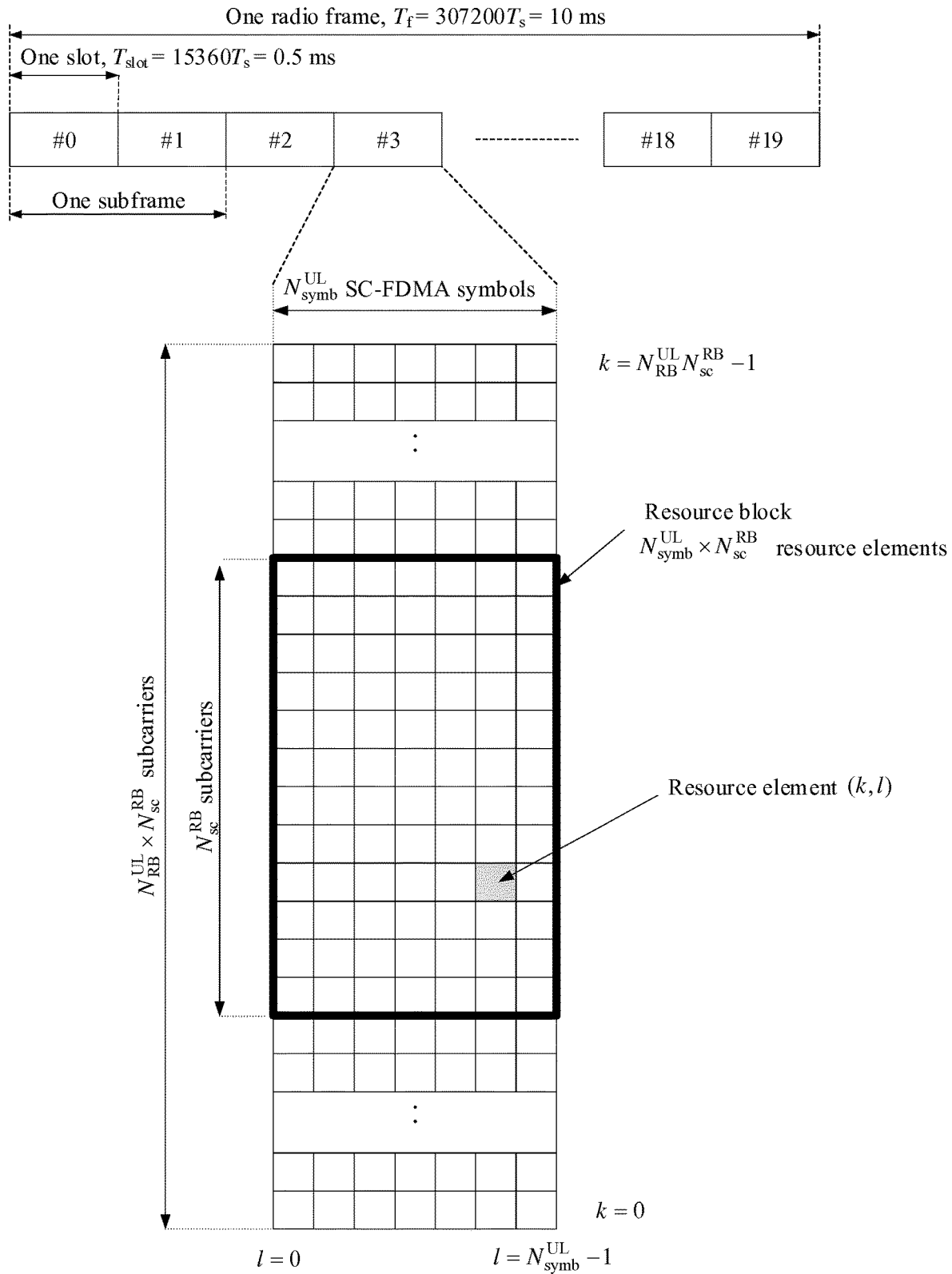
Figure 4:
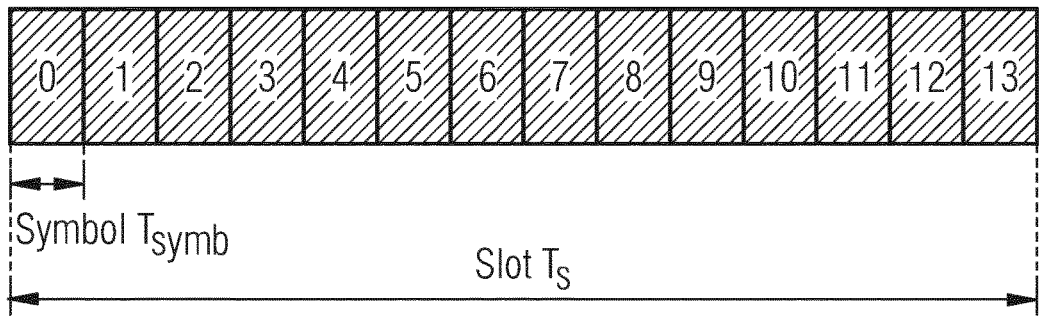
FIG. 4 shows an exemplary configuration for an NR slot comprising 14 OFDM symbols.
Figure 5:
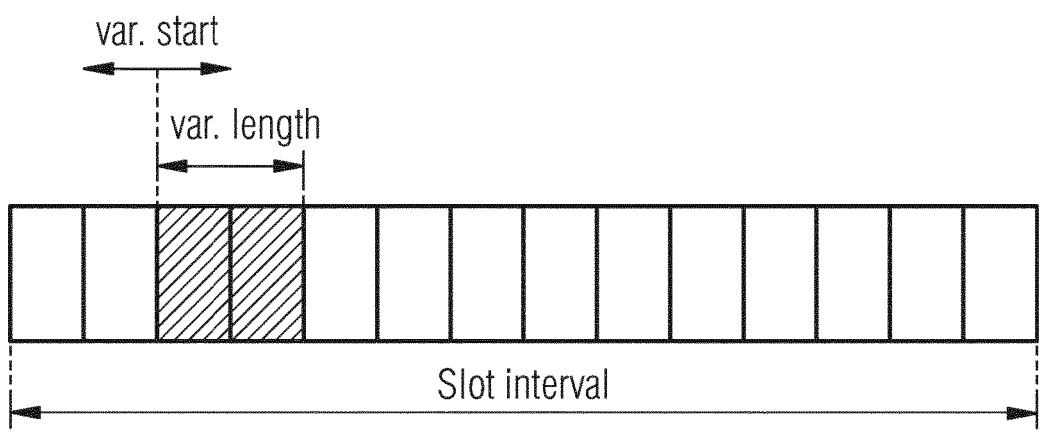
FIG. 5 shows an exemplary two-symbol NR mini-slot.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an S1 interface, such as shown in FIG. 1. As another example, gNBs comprising a NR RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1630 operation in unlicensed spectrum, particularly to indicate, assign, and/or configure time resources for UEs—such as UE 1610—to transmit on an UL shared channel in unlicensed spectrum. For example, by assigning different transmission starting symbols within a timeslot, such techniques can reduce UL contention between UEs that are assigned the same UL timeslot resources. When used in NR UEs (e.g., UE 1610) and gNBs (e.g., gNBs comprising RAN 1630), exemplary embodiments described herein can provide various improvements, benefits, and/or advantages that facilitate the use of unlicensed spectrum in addition to licensed spectrum. Using additional spectrum resources to provide services improves the performance of these services as experienced by OTT service providers and end-users, including more consistent data throughout and fewer delays without excessive UE power consumption or other reductions in user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method in a user equipment (UE) for selecting logical channels for transmission on granted uplink (UL) resources within a cell of a radio access network (RAN), the method comprising:
   receiving, from a network node in the RAN, a grant of UL resources associated with a carrier in an unlicensed spectrum, the carrier comprising a plurality of carrier parts forming a corresponding plurality of radio channels;
   selecting one or more of a plurality of logical channels for transmission during a subsequent transmission time interval (TTI) using the granted UL resources, the selecting based on information indicating one of a plurality of states associated to each of the radio channels, a state being at least one of: an availability, a load and a radio quality of a corresponding radio channel;
   the plurality of states comprising a first state and a second state, the first state respectively having a higher availability, a lower load and a higher radio quality compared to the second state; and
   the selecting being performed such that data of a first logical channel with a higher priority compared to a second logical channel is transmitted over a first radio channel associated to the first state and data of a second logical channel with a lower priority compared to the first logical channel is transmitted over a second radio channel associated to the second state.

2. The method of claim 1, wherein the plurality of logical channels comprises one or more medium access control (MAC) logical data channels and one or more MAC control elements (CEs).

3. The method of claim 1, further comprising
   receiving, from the network node, the information indicating the respective state of each of the radio channels, wherein the information further comprises respective indications of whether each of the logical channels is selectable for a particular radio channel of the plurality of radio channels.

4. The method of claim 3, wherein the information is received via one of the following: dedicated RRC signaling, common RRC signaling, MAC control element and downlink control indicator.

5. The method of claim 3, wherein if a particular logical channel is indicated as not selectable for a particular radio channel, the method further comprises refraining from selecting that particular logical channel for transmission using granted UL resources comprising that particular radio channel.

6. The method of claim 1, wherein the method is performed by the MAC layer of a UE.

7. A method in a network node for configuring a user equipment (UE) to select logical channels for transmission on granted uplink (UL) resources withing a cell of a radio access network (RAN), the method comprising:
  determining respective states of a plurality of radio channels, each comprising a part of a carrier in an unlicensed spectrum, a state being at least one of: an availability, a load and a radio quality of a corresponding radio channel;
  transmitting, to the UE information indicating the determined state for each of the radio channels and information for selecting one or more of a plurality of logical channels for transmission during a subsequent transmission time interval (TTI) using granted UL resources, the selecting based on respective priorities associated with the logical channels and on information indicating one of a plurality of states associated to each of the radio channels; and
  transmitting, to the UE, a grant of UL resources for transmission of data associated with at least a portion of the logical channels, the resources being associated with the plurality of radio channels,
  the plurality of states comprising a first state and a second state, the first state respectively having a higher availability, a lower load and a higher radio quality compared to the second state; and
  the selecting being performed such that data of a first logical channel with a higher priority compared to a second logical channel is transmitted over a first radio channel associated to the first state and data of a second logical channel with a lower priority compared to the first logical channel is transmitted over a second radio channel associated to the second state.

8. The method of claim 7, wherein the plurality of logical channels comprises one or more MAC logical data channels and one or more MAC CEs.

9. The method of claim 7, wherein the information is transmitted via one of the following: dedicated RRC signaling, common RRC signaling, MAC CE, and downlink control indicator.

10. The method of claim 7, wherein the information further comprises respective indications of whether each of the logical channels is selectable for a particular radio channel of the plurality of radio channels.

11. The method of claim 7, further comprising
  receiving, from the UE on a subset of the radio channels comprising the carrier, data associated with logical channels that were indicated as selectable for transmission on the subset of the radio channels.

12. The method of claim 7, wherein the method is performed by an NR base station (gNB).

13. A user equipment (UE) configured to select logical channels for transmission on granted uplink (UL) resources within a cell of a radio access network (RAN), the UE comprising:
  communication circuitry configured to communicate with a network node serving the cell; and
  processing circuitry operatively associated with the communication circuitry and configured to:
    receive, from a network node in the RAN, a grant of UL resources associated with a carrier in an unlicensed spectrum, the carrier comprising a plurality of carrier parts forming a corresponding plurality of radio channels;
    select one or more of a plurality of logical channels for transmission during a subsequent transmission time interval (TTI) using the granted UL resources, the selecting based on information indicating one of a plurality of states associated to each of the radio channels, a state being at least one of: an availability, a load and a radio quality of a corresponding radio channel;
    the plurality of states comprising a first state and a second state, the first state having a higher availability, a lower load and a higher radio quality compared to the second state; and
    the selecting performed such that data of a first logical channel with a higher priority compared to a second logical channel is transmitted over a first radio channel associated to the first state and data of a second logical channel with a lower priority compared to the first logical channel is transmitted over a second radio channel associated to the second state.

14. A network node arranged to configure a user equipment (UE) to select logical channels for transmission on granted uplink (UL) resources within a cell of a radio access network (RAN), the network node comprising:
  communication circuitry configured to communicate with the UEs; and
  processing circuitry operatively associated with the communication circuitry and configured to:
    determine respective states of a plurality of radio channels comprising a carrier frequency in unlicensed spectrum, a state being at least one of: an availability, a load and a radio quality of a corresponding radio channel;
    transmit, to the UE information indicating the determined state for each of the radio channels and information for selecting one or more of a plurality of logical channels for transmission during a subsequent transmission time interval (TTI) using granted UL resources, the selecting based on respective priorities associated with the logical channels and on information indicating one of a plurality of states associated to each of the radio channels; and
    transmit, to the UE, a grant of UL resources for transmission of data associated with at least a portion of the logical channels, the resources associated with the plurality of radio channels,
    the plurality of states comprising a first state and a second state, the first state respectively having a higher availability, a lower load and a higher radio quality compared to the second state; and
    the selecting being performed such that data of a first logical channel with a higher priority compared to a second logical channel is transmitted over a first radio channel associated to the first state and data of a second logical channel with a lower priority compared to the first logical channel is transmitted over a second radio channel associated to the second state.

* * * * *